US012246700B2

(12) United States Patent
Zhang et al.

(10) Patent No.: US 12,246,700 B2
(45) Date of Patent: Mar. 11, 2025

(54) MACHINE LEARNING-BASED TRACTIVE LIMIT AND WHEEL STABILITY STATUS ESTIMATION

(71) Applicant: GM Global Technology Operations LLC, Detroit, MI (US)

(72) Inventors: Yubiao Zhang, Sterling Heights, MI (US); Qingrong Zhao, Warren, MI (US); Edward Joseph Ecclestone, Oakville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 18/057,281

(22) Filed: Nov. 21, 2022

(65) Prior Publication Data

US 2024/0166192 A1 May 23, 2024

(51) Int. Cl.
*B60W 30/02* (2012.01)
*B60W 40/06* (2012.01)
*G06N 20/00* (2019.01)

(52) U.S. Cl.
CPC ............ *B60W 30/02* (2013.01); *B60W 40/06* (2013.01); *G06N 20/00* (2019.01);
(Continued)

(58) Field of Classification Search
CPC .... B60W 30/02; B60W 40/06; B60W 40/064; B60W 40/068; B60W 40/10; B60W 40/1005; B60W 40/101; B60W 40/103; B60W 40/12; B60W 2520/10; B60W 2520/105; B60W 2520/125; B60W 2520/14; B60W 2520/26; B60W 2520/28;
(Continued)

(56) References Cited

U.S. PATENT DOCUMENTS 5,586,028 A * 12/1996 Sekine .................... B60T 8/174
701/1
5,734,319 A * 3/1998 Stephens ............... B60C 23/061
340/444

(Continued)

FOREIGN PATENT DOCUMENTS

CN 107379897 A * 11/2017 ......... B60C 23/0433
EP 1272365 B1 * 3/2010 ........... B60C 23/061
WO WO-2022151642 A1 * 7/2022 ....... G06F 18/24323

*Primary Examiner* — John M Zaleskas
(74) *Attorney, Agent, or Firm* — Vivacqua Crane, PLLC

(57) ABSTRACT

A method of estimating a performance characteristic of a wheel of a vehicle, includes selecting relevant input features based on wheel dynamics and tire behavior, and collecting experimental data for each of the relevant input features at each of a plurality of vehicle operating conditions. The method further includes manually identifying and labeling wheel stability status over time from the experimental data and calculating tractive limit over time from the experimental data. The method also includes training a tractive limit model and training a wheel stability status model. The method further includes receiving a plurality of testing inputs, wherein each of the plurality of testing inputs is received from a sensor on-board the vehicle or from a controller on-board the vehicle and, processing the received testing inputs in a predetermined machine learning process to calculate in one or more data processors a prediction of the performance characteristic.

7 Claims, 4 Drawing Sheets

(52) U.S. Cl.
CPC ..... *B60W 2520/26* (2013.01); *B60W 2520/28* (2013.01); *B60W 2520/30* (2013.01)

(58) Field of Classification Search
CPC ......... B60W 2520/30; B60W 2720/26; B60W 2720/263; B60W 2720/266; B60T 2210/10; B60T 2210/12; B60T 2210/122; G06N 3/08–0985; G06N 20/00; G06N 20/10
See application file for complete search history.

(56) References Cited

U.S. PATENT DOCUMENTS

| | | | | |
|---|---|---|---|---|
| 9,139,204 B1* | 9/2015 | Zhao | ................... | B60W 40/06 |
| 2003/0164036 A1* | 9/2003 | Giustino | ............... | B60T 8/1725 73/146 |
| 2004/0024514 A1* | 2/2004 | Levy | ................... | G05B 13/024 701/82 |
| 2004/0032165 A1* | 2/2004 | Levy | ....................... | B60T 8/172 303/150 |
| 2004/0158414 A1* | 8/2004 | Bertrand | ............... | G01M 17/02 702/41 |
| 2004/0158441 A1* | 8/2004 | Bertrand | ............... | G01L 5/1627 702/194 |
| 2005/0005692 A1* | 1/2005 | Giustino | ............... | B60T 8/1725 73/146 |
| 2005/0065698 A1* | 3/2005 | Bertrand | ............... | B60T 8/1725 73/146 |
| 2005/0065699 A1* | 3/2005 | Bertrand | ............... | B60T 8/1725 701/80 |
| 2005/0159874 A1* | 7/2005 | Bertrand | ................. | G01N 19/02 701/80 |
| 2005/0212356 A1* | 9/2005 | Huchard | ................. | B60T 13/74 303/112 |
| 2008/0053210 A1* | 3/2008 | Bertrand | ................. | B60T 8/172 73/146 |
| 2008/0190187 A1* | 8/2008 | Bertrand | ............... | B60T 8/1725 73/146 |
| 2008/0294352 A1* | 11/2008 | Spetler | ................. | G01M 17/02 73/146 |
| 2011/0264300 A1* | 10/2011 | Tuononen | ............. | G01M 17/02 701/1 |
| 2015/0166072 A1* | 6/2015 | Powers | ............... | B60W 40/076 701/1 |
| 2016/0129737 A1* | 5/2016 | Singh | .................... | B60W 40/13 73/146.3 |
| 2016/0159365 A1* | 6/2016 | Singh | .................. | B60W 40/068 701/32.9 |
| 2016/0159367 A1* | 6/2016 | Singh | .................... | B60T 8/1725 701/32.9 |
| 2017/0113495 A1* | 4/2017 | Singh | .................... | B60C 11/246 |
| 2017/0113499 A1* | 4/2017 | Singh | .................... | B60C 11/246 |
| 2019/0001757 A1* | 1/2019 | Singh | .................. | B60C 23/0415 |
| 2019/0024781 A1* | 1/2019 | Chrungoo | ............ | G08G 1/0133 |
| 2019/0176784 A1* | 6/2019 | Laine | ..................... | B60T 8/172 |
| 2019/0188495 A1* | 6/2019 | Zhao | ................... | G06V 20/588 |
| 2019/0255891 A1* | 8/2019 | Makke | ..................... | G01N 3/56 |
| 2020/0001662 A1* | 1/2020 | Storti | .................... | B60C 11/246 |
| 2020/0023852 A1* | 1/2020 | Yi | ........................ | B60W 40/068 |
| 2020/0238770 A1* | 7/2020 | Karlsson | ............. | B60C 23/061 |
| 2020/0250899 A1* | 8/2020 | Sakakibara | ........... | B60T 8/1725 |
| 2020/0307327 A1* | 10/2020 | Karlsson | .................. | G06N 5/04 |
| 2021/0122340 A1* | 4/2021 | Bhimani | ................... | G06N 3/08 |
| 2021/0125428 A1* | 4/2021 | Tedesco | ................ | G07C 5/0808 |
| 2021/0171004 A1* | 6/2021 | Han | ........................ | G06N 3/044 |
| 2021/0213955 A1* | 7/2021 | Zhao | .................... | G06F 18/2431 |
| 2022/0126801 A1* | 4/2022 | Laine | ..................... | B60T 8/1708 |
| 2023/0047444 A1* | 2/2023 | Henderson | ............. | B60T 8/175 |
| 2023/0123850 A1* | 4/2023 | Takezawa | .......... | B60C 23/0488 73/146.5 |
| 2023/0219576 A1* | 7/2023 | Lee | ..................... | B60W 40/064 701/74 |
| 2023/0256778 A1* | 8/2023 | Wei | ..................... | B60C 23/0416 701/29.4 |
| 2023/0356556 A1* | 11/2023 | Subramanian | ........ | B60C 23/002 |
| 2024/0078360 A1* | 3/2024 | Xu | ......................... | G06F 30/27 |

\* cited by examiner

MACHINE LEARNING-BASED TRACTIVE LIMIT AND WHEEL STABILITY STATUS ESTIMATION

INTRODUCTION

The present disclosure relates to estimating an operating range of a vehicle wheel with respect to road traction.

The ability of a vehicle to corner, accelerate, and brake depends on friction between a tire mounted to a vehicle wheel and the road surface with which the tire is in contact. Vehicles commonly include systems to control drive torque and/or braking torque to maintain a desired friction level at the tire/road interface.

Thus, while current vehicle control systems achieve their intended purpose, there is a need for a new and improved system and method for dynamic vehicle control.

SUMMARY

According to several aspects, a method of estimating a performance characteristic of a wheel of a vehicle includes selecting relevant input features based on wheel dynamics and tire behavior, and collecting experimental data for each of the relevant input features at each of a plurality of vehicle operating conditions. The method further includes manually identifying and labeling wheel stability status over time from the experimental data, and calculating tractive limit over time from the experimental data. The method additionally includes training a tractive limit model using a machine learning regression algorithm with the experimental data as inputs and the calculated tractive limit as an output, and training a wheel stability status model using a machine learning classification algorithm with the experimental data as inputs and the labeled wheel stability status as an output. The method further includes receiving a plurality of testing inputs, wherein each of the plurality of testing inputs is received from a sensor on-board the vehicle or from a controller on-board the vehicle; and processing the received testing inputs in a predetermined machine learning process to calculate in one or more data processors a prediction of the performance characteristic.

In an additional aspect of the present disclosure, the performance characteristic is tractive limit.

In another aspect of the present disclosure, the machine learning regression algorithm is Gaussian process regression.

In another aspect of the present disclosure, the machine learning regression algorithm is a neural network algorithm.

In another aspect of the present disclosure, the machine learning regression algorithm is a kernel-based regression algorithm.

In another aspect of the present disclosure, the performance characteristic is wheel stability status.

In an additional aspect of the present disclosure, the machine learning classification algorithm is Gaussian process classification.

In another aspect of the present disclosure, the plurality of testing inputs includes two or more of longitudinal velocity, longitudinal acceleration, lateral acceleration, yaw rate, wheel angular velocity, wheel angular acceleration, normal force, steering wheel angle, or lateral distance between vehicle center of gravity and wheel center.

In an additional aspect of the present disclosure, the method further includes comparing the calculated prediction of the performance characteristic to ground truth, and in the event that the calculated prediction of the performance characteristic differs from ground truth by more than a predetermined threshold, repeating the step of training the tractive limit model and/or the step of training the wheel stability status model with modified hyperparameters for the training process.

In another aspect of the present disclosure, the method further includes updating the trained tractive limit model and/or the trained wheel stability status model using data from the testing inputs.

According to several aspects, a vehicle includes a wheel, and a controller configured to receive a plurality of inputs, wherein each of the plurality of inputs is received from a sensor on-board the vehicle or from a controller on-board the vehicle. The controller is additionally configured to process the received inputs in a predetermined machine learning process to calculate in one or more data processors a prediction of a performance characteristic of the wheel, wherein hyperparameters of the predetermined machine learning process were previously determined in an offline training process using machine learning.

In an additional aspect of the present disclosure, the performance characteristic is tractive limit.

In another aspect of the present disclosure, the predetermined machine learning process is regression.

In another aspect of the present disclosure, the performance characteristic is wheel stability status.

In an additional aspect of the present disclosure, the predetermined machine learning process is classification.

In another aspect of the present disclosure, the plurality of inputs includes two or more of longitudinal velocity, longitudinal acceleration, lateral acceleration, yaw rate, wheel angular velocity, wheel angular acceleration, normal force, steering wheel angle, or lateral distance between vehicle center of gravity and wheel center.

According to several aspects, a vehicle includes a wheel, and a controller. The controller is configured to receive a plurality of inputs, including two or more of longitudinal velocity, longitudinal acceleration, lateral acceleration, yaw rate, wheel angular velocity, wheel angular acceleration, normal force, steering wheel angle, or lateral distance between vehicle center of gravity and wheel center. The controller is further configured to process the received inputs in a machine learning regression process to calculate in one or more data processors a prediction of a tractive limit of the wheel, and to process the received inputs in a machine learning classification process to calculate in one or more data processors a prediction of a wheel stability status of the wheel. Hyperparameters of the machine learning regression process and of the machine learning classification process were previously determined in an offline training process.

In another aspect of the present disclosure, the calculated predicted tractive limit of the wheel and/or the calculated predicted wheel stability status is used to determine a control signal to an actuator on the vehicle.

In an additional aspect of the present disclosure, the actuator is configured to control drive torque or brake torque delivered to the wheel.

In another aspect of the present disclosure, the actuator is configured to control steering angle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicles operating in the real world are expected to perform under conditions that are changing and unpredictable. As an example, the road surface may include sections that are paved with one of several possible paving materials, and/or unpaved. Additionally, the road surface may be wet, dry, icy, and/or covered in loose debris such as sand, gravel, or snow. These various conditions may change the available tire traction, reducing the frictional forces generated by the tires and making it challenging to maintain vehicle control.

Figure 1:
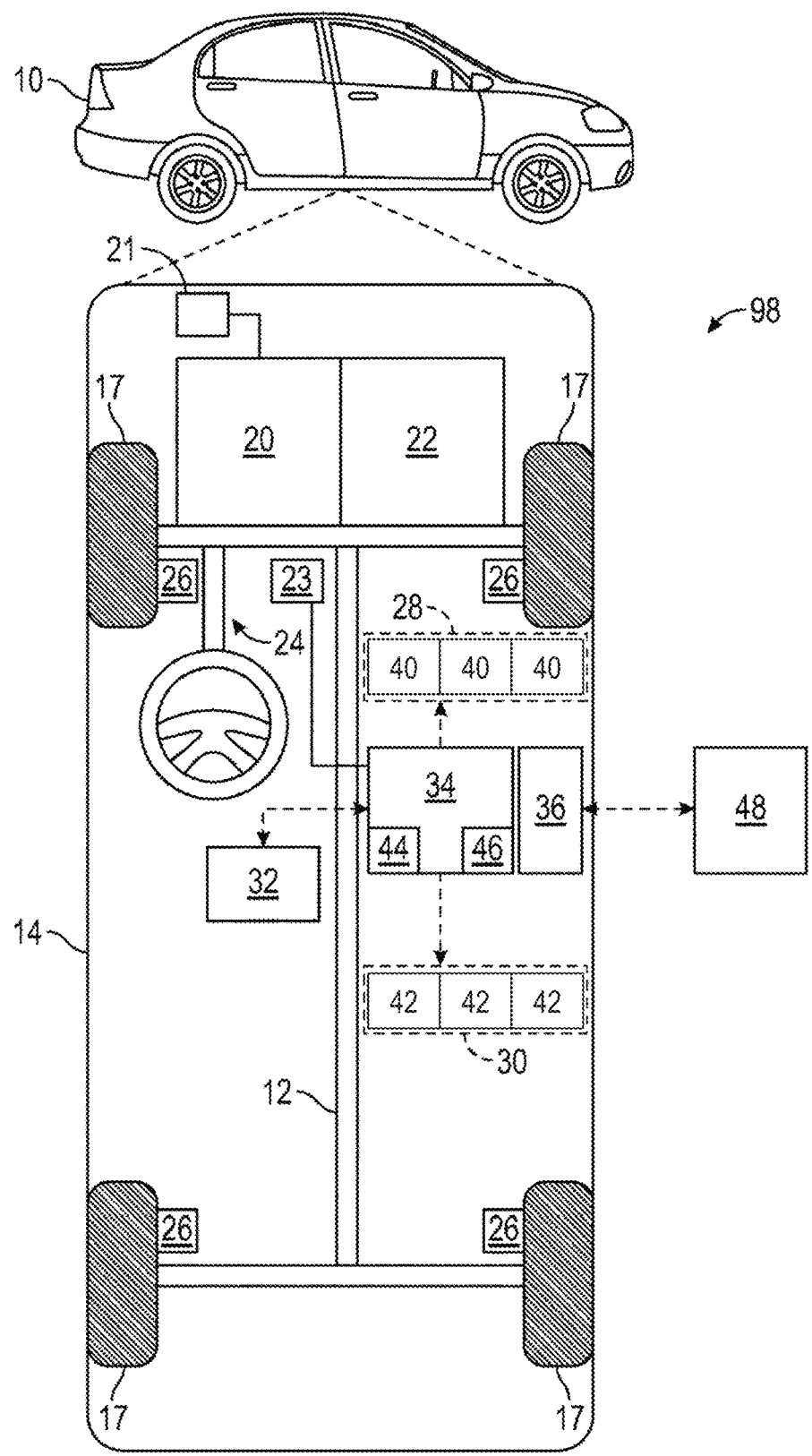
FIG. 1 is a schematic block diagram of a vehicle according to an exemplary embodiment.

As depicted in FIG. 1, a vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. Each wheel 17 has a tire 18 mounted to its outer circumference.

The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used.

As shown, the vehicle 10 may include a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, a longitudinal velocity sensor, a longitudinal acceleration sensor, a lateral acceleration sensor, a yaw rate sensor, a wheel angular velocity sensor, a wheel angular acceleration sensor, a normal force sensor, a steering wheel angle sensor, and/or other sensors. The actuator system 30 includes one or more actuator devices 42 that control one or more vehicle features such as, but not limited to, drive torque delivered to the wheels by the propulsion system 20 and by the transmission system 22, the steering angle delivered by the steering system 24, and the brake torque delivered by the brake system 26. In various embodiments, the vehicle features can further include interior and/or exterior vehicle features such as, but are not limited to, doors, a trunk, and cabin features such as air, music, lighting, etc. (not numbered). Because the sensor system 28 provides object data to the controller 34, the sensor system 28 and its sensors 40 are considered sources of information (or simply sources).

The data storage device 32 stores data for use in controlling the vehicle 10. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured receive inputs from the user via the user interface 23. The user interface 23 includes a display configured to display information to the user (e.g., vehicle operator or passenger).

The communication system 36 is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 includes a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

Figure 2:
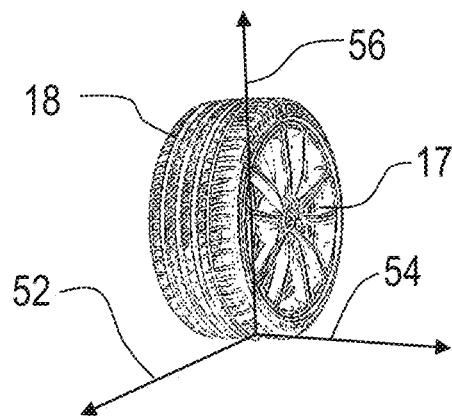
FIG. 2 is an illustration of forces at a tire/road interface, according to an exemplary embodiment.

Referring to FIG. 2, a vehicle wheel 17 on which is mounted an automobile tire 18 is illustrated, along with arrows representing force vectors that are present at the interface between the tire 18 and the road surface. The first arrow 52 represents the longitudinal force component $F_x$, which is the force acting in the direction of vehicle travel. The longitudinal force $F_x$ is responsible for vehicle acceleration and braking. The second arrow 54 represents the lateral force component $F_y$, which is the force acting in the plane of the road surface perpendicular to the direction of vehicle travel. The lateral force $F_y$ is responsible for vehicle cornering and yaw plane stability. The third arrow 56 represents the normal force $F_z$, which is the force acting in the direction normal to the road surface.

Figure 3:
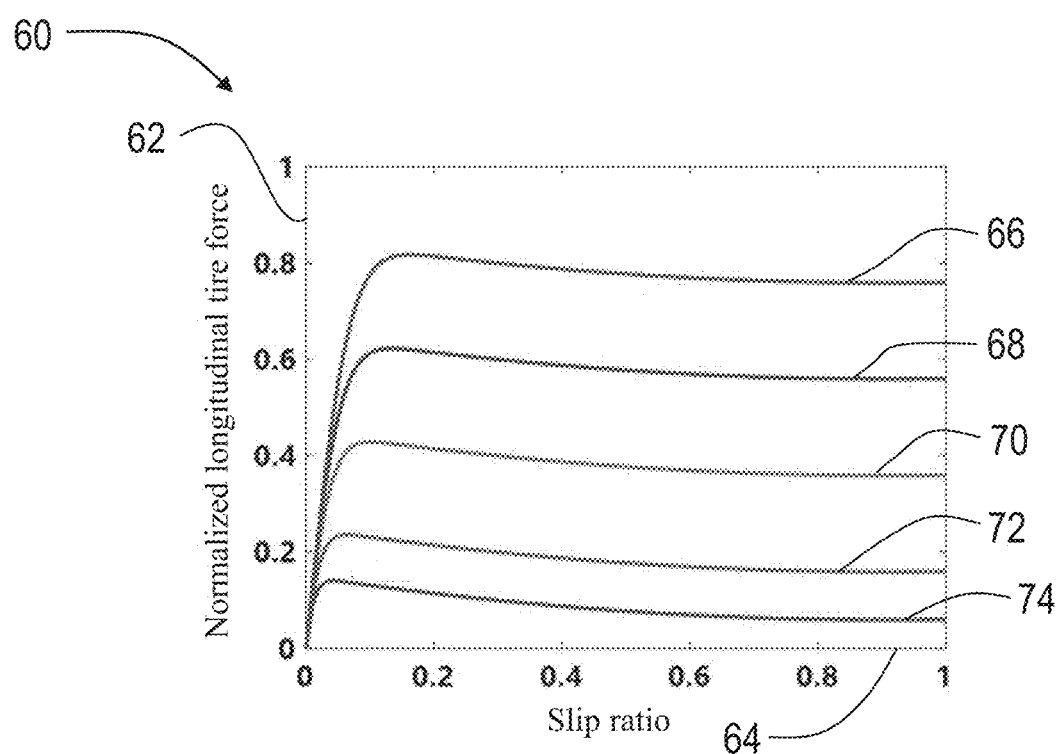
FIG. 3 is a graph of normalized longitudinal tire force as a function of slip ratio for various road surfaces.

Referring to FIG. 3, a graph 60 of normalized longitudinal tire force as a function of slip ratio for various road surfaces is presented. The y-axis 62 represents the normalized longitudinal tire force, commonly referred to as µ, which is defined as the longitudinal force $F_x$ divided by the normal force $F_z$, i.e.

$$\mu = \frac{F_x}{F_z} \quad \text{(Equation 1)}$$

In the graph 60, the x-axis 64 represents the slip ratio, which is defined as:

$$\text{slip ratio} = \frac{\omega \cdot R_{eff} - V}{V} \quad \text{(Equation 2)}$$

where ω=angular velocity of the wheel
$R_{eff}$=effective radius of the tire
V=forward velocity of the vehicle With continued reference to FIG. 3, examples of the relationship between normalized longitudinal tire force µ and slip ratio are plotted for various road surfaces and conditions. In FIG. 3, trace 66 represents a dry asphalt road, trace 68 represents wet asphalt, trace 70 represents cobblestone, trace 72 represents snow, and trace 74 represents ice. The maximum longitudinal force that can be generated at the tire-road interface, also known as the tractive limit, depends not only on the road surface but also on the slip ratio. The behavior of the µ-slip relationship can be generally divided into three regions. At low values of slip, µ increases in a generally linear fashion as slip increases. As slip continues to increase, the slope of the µ-slip relationship decreases to zero and a peak value of µ is reached. Further increases in slip result in a tire saturation region of decreasing µ with relatively flat slope.

The graph 60 depicts normalized longitudinal tire force FX for a tire rolling in the direction of vehicle travel in the absence of lateral force $F_y$. In the presence of lateral force $F_y$, for example if the vehicle is cornering or undergoing yaw motion, the capacity to generate longitudinal force can be estimated using a friction ellipse as:

$$F_{x,cap} = \sqrt{(\mu F_z)^2 - F_y^2} \quad \text{(Equation 3)}$$

It is desirable to operate the tire near the peak of the µ-slip curve to prevent tire saturation while maximizing control performance. In practice, it is challenging to estimate forces and friction coefficient µ in real time using readily available vehicle sensor readings. Additionally, the longitudinal force capacity $F_{x,cap}$ varies from road to road.

Figure 4:
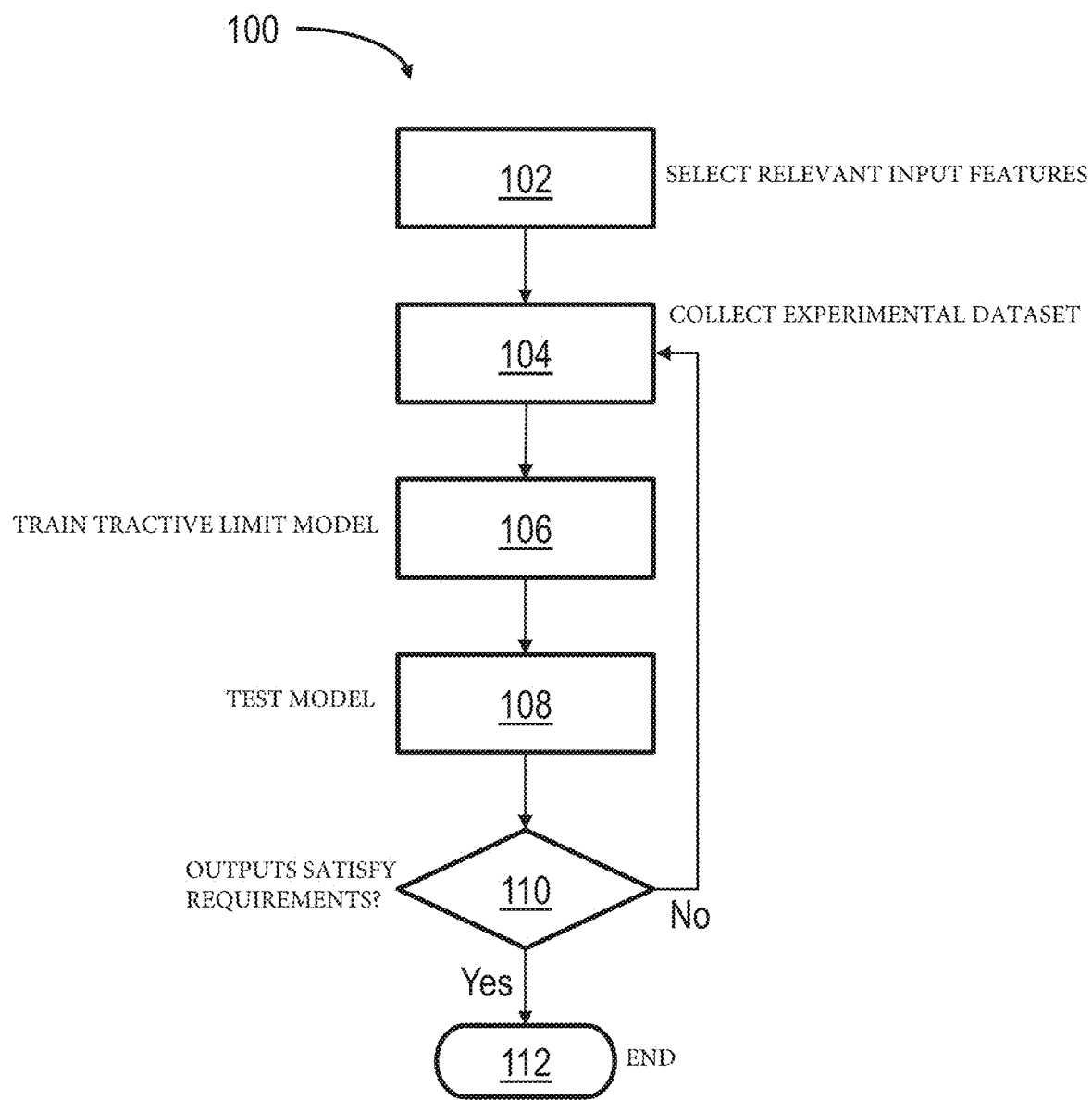
FIG. 4 is a flow chart of a machine learning-based tractive limit and wheel stability estimation algorithm, according to an exemplary embodiment.

Referring to FIG. 4, a flow chart of a machine learning-based tractive limit and wheel stability estimation algorithm 100 is presented. As used herein, the term "machine learning" refers to algorithms that build a model based on sample data, known as training data, in order to make predictions or decisions without being explicitly programmed to do so. As a non-limiting example, a machine learning algorithm may be a regression algorithm where the output is continuous in nature and the inputs may be numeric or categorical. As another non-limiting example, a machine learning algorithm may be a classification algorithm which classifies a data point into one of a fixed number of classes. A hyperparameter is a parameter that is set before the learning process begins. These parameters are tunable and can directly affect how well a model trains.

With continued reference to FIG. 4, in the input selection step 102, relevant input features are selected based on wheel dynamics and tire behavior. Wheel dynamics are described by the equation:

$$I_w \dot{\omega} = T_{dr} - F_x R_{eff} \quad \text{(Equation 4)}$$

where $I_w$ is the wheel inertia;

$\omega$ is the wheel angular acceleration'

$T_{dr}$ is the drive torque to the wheel $F_x$, the longitudinal force, is a function of slip ratio, slip angle, $\mu$, and $F_z$ $R_{eff}$ is the effective tire radius.

The relevant input features may include longitudinal velocity, longitudinal acceleration, lateral acceleration, yaw rate, wheel angular velocity, wheel angular acceleration, normal force, steering wheel angle, and lateral distance between vehicle center of gravity and wheel center. Rather than using all of the input feature listed, it may be desirable to only use a subset of the listed features. It may also be desirable to use one or more input features not included in the foregoing list. Selection of input features is based on reaching a balance between algorithm performance and computational demands.

Figure 5:
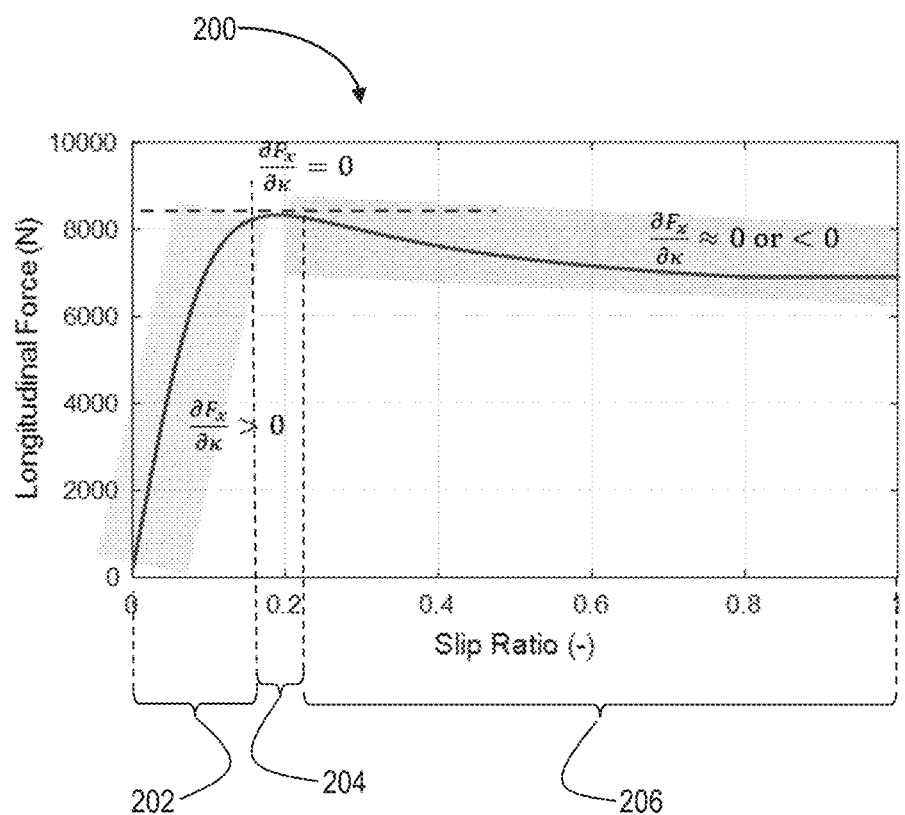
FIG. 5 is a graph of longitudinal force as a function of slip with wheel stability status regions identified, according to an exemplary embodiment.

With continued reference to FIG. 4, algorithm step 104 includes ground truth estimating and labeling. In the ground truth estimating and labeling step 104, an experimental dataset is collected using an instrumented vehicle, covering various driving maneuvers and road surfaces. As a non-limiting example, data may be recorded with increasing speed while cornering on dry asphalt, straight-line acceleration on dry asphalt, straight-line acceleration on ceramic tiles, acceleration in a turn from rest on basalt, and straight-line acceleration on a split surface type. After collecting the data, in a labeling procedure the data is analyzed to identify wheel stability status as a function of time. The behavior of the wheel with time can be visualized as a trajectory on a longitudinal force vs. slip plot 200 such as is shown in FIG. 5. The longitudinal force vs. slip plot 200 has a shape generally like the μ-slip relationship depicted in FIG. 3, but the y-axis scale has units of force (e.g., Newtons), and ranges from zero to a maximum value somewhat less than the normal force $F_z$ at the wheel. In a non-limiting example, wheel stability status may be correlated to three regions of the longitudinal force vs. slip relationship 200. In a first region 202, referred to herein as the linear region, the slope of the longitudinal force vs. slip relationship is positive. In a second region 204, referred to herein as the near-peak region, the longitudinal force reaches a maximum value and the slope of the of the longitudinal force vs. slip relationship is zero. In a third region 206, referred to herein as the saturated region, the slope of the of the longitudinal force vs. slip relationship is approximately zero or is negative. In the wheel stability status labeling procedure, it may be advantageous to omit data corresponding to certain vehicle operating conditions, for example vehicle speed less than a predetermined threshold, wheel drive torque less than a predetermined threshold, and/or braking.

The tractive limit, i.e., the maximum longitudinal force that can be generated at the tire-road interface, can be estimated for each region 202, 204, 206. In the linear region 202, a friction ellipse is used to estimate the maximum capacity of the longitudinal friction coefficient at a time t as:

$$\mu_{x,cap}(t) = \frac{1}{F_z(t)} \sqrt{(\mu F_z(t))^2 - F_y(t)^2} \quad \text{(Equation 5)}$$

In the near-peak region 204, the maximum capacity of the longitudinal friction coefficient at a time t is estimated as:

$$\mu_{x,cap}(t) = \frac{F_x(t)}{F_z(t)} \quad \text{(Equation 6)}$$

In the saturated region 206, in a first method the value of $\mu_{x,cap}(t)$ that was calculated in the most recent near-peak region is held for subsequent calculations. In an alternative method in the saturated region 206, the current value of $\mu_x(t)$ is used, i.e., $\mu_{x,cap} = \mu_x(t)$.

With continued reference to FIG. 4, from the ground truth estimating and labeling step 104 the algorithm proceeds to a training step 106. The training step 106 includes training a regression model to predict tractive limit. The training step 106 also includes training a classification model to predict wheel stability status (e.g., linear region, near-peak region, or saturated region).

In algorithm step 108, testing and prediction of the training model is performed using input features from a new dataset that was not used to develop the training model. For each wheel, input features may include longitudinal velocity, longitudinal acceleration, lateral acceleration, yaw rate, wheel angular velocity, wheel angular acceleration, normal force, steering wheel angle, and lateral distance between vehicle center of gravity and wheel center. For each wheel, predicted output includes a tractive limit prediction with associated uncertainty from a machine learning regression algorithm. Predicted output also includes a wheel stability status and uncertainty from a classification algorithm. Predicted tractive limit and wheel stability status classification outputs are compared to ground truth.

Continuing to refer to FIG. 3, the algorithm proceeds to decision block 110. If the predicted outputs in step 108 are judged to satisfy performance requirements for the algorithm, the algorithm ends at block 112. If the outputs in step 108 are judged to not meet performance requirements for the algorithm, execution returns to step 104 and training is repeated. For subsequent iterations, hyperparameter tuning of the model may use random search to define distributions for each hyperparameter, sample a number of combinations of hyperparameter values, and determine the combination that provides the best model performance.

Testing results have verified that machine learning regression algorithm tractive limit estimations produce accurate predictions that correlate with ground truth. Thereby, it can be concluded that a relationship between tractive limit and measurement signals can be learned using machine learning principles. Similarly, testing results have verified that wheel stability status can be predicted accurately with machine learning classification algorithms.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

The tractive limit estimate and wheel stability status estimate obtained from the disclosed method may be provided to a controller to improve vehicle control performance. By way of nonlimiting example, a traction control system, a yaw control system, and an antilock braking system may all benefit from having tractive limit estimate and/or wheel stability status estimate information available.

A machine learning-based tractive limit and wheel stability status estimation method of the present disclosure offers several advantages. Learning the relationship between the input features and the tractive limit avoids the need to determine road surface condition or estimate the tire-road friction coefficient. The method of the present disclosure uses only on-board sensor data and learns online. Performance can continuously improve by learning from more data and enhancing the regression and classification models. The method is applicable to all of the wheels on the vehicle and is scalable to different vehicles. By recognizing and minimizing tire saturation, control performance can be maximized, thereby improving safety and maneuverability.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of estimating a performance characteristic of a wheel of a vehicle, the method comprising:
    selecting relevant input features based on wheel dynamics and tire behavior, wherein the relevant input features consist all of longitudinal velocity, longitudinal acceleration, lateral acceleration, yaw rate, wheel angular velocity, wheel angular acceleration, normal force, steering wheel angle, and lateral distance between vehicle center of gravity and wheel center;
    collecting experimental data from one or more test vehicles for each of the relevant input features at each of a plurality of vehicle operating conditions;
    manually identifying and labeling wheel stability status over time from the experimental data, excluding experimental data when a test vehicle speed is less than a predetermined threshold, when wheel drive torque is less than a predetermined threshold, and when the test vehicle is braking;
    calculating a tractive limit over time from the experimental data;
    training a tractive limit model using a machine learning regression algorithm with the experimental data as inputs and the calculated tractive limit as an output;
    training a wheel stability status model using a machine learning classification algorithm with the experimental data as inputs and the labeled wheel stability status as an output;
    receiving a plurality of testing inputs, wherein each of the plurality of testing inputs is received from one or more sensors on-board the vehicle and include longitudinal velocity, longitudinal acceleration, lateral acceleration, yaw rate, wheel angular velocity, wheel angular acceleration, normal force, steering wheel angle, and lateral distance between vehicle center of gravity and wheel center; and
    processing the received testing inputs using the tractive limit model and the wheel stability status model to calculate the estimate of the performance characteristic that includes a predicted tractive limit and a predicted wheel stability status.

2. The method of claim 1, wherein the machine learning regression algorithm used to train the tractive limit model is Gaussian process regression.

3. The method of claim 1, wherein the machine learning regression algorithm used to train the tractive limit model is a neural network algorithm.

4. The method of claim 1, wherein the machine learning regression algorithm used to train the tractive limit model is a kernel-based regression algorithm.

5. The method of claim 1, wherein the machine learning classification algorithm used to train the wheel stability status model is Gaussian process classification.

6. The method of claim 1, further comprising
    comparing the calculated prediction of the performance characteristic to a ground truth, and
    in the event that the calculated prediction of the performance characteristic differs from the ground truth by more than a predetermined threshold, repeating the step of training the tractive limit model and the step of training the wheel stability status model with modified hyperparameters.

7. The method of claim 1, further comprising updating the trained tractive limit model and/or the trained wheel stability status model using data from the testing inputs.

* * * * *